US011328712B2

United States Patent
Ponniah et al.

(10) Patent No.: US 11,328,712 B2
(45) Date of Patent: May 10, 2022

(54) DOMAIN SPECIFIC CORRECTION OF OUTPUT FROM AUTOMATIC SPEECH RECOGNITION

(71) Applicant: International Business Machines Corporation, Armonk, NY (US)

(72) Inventors: Anbumunee Ponniah, Bangalore (IN); Abhishek Singh, West Bengal (IN); Nithin Mathew, Bangalore (IN); Balasubramaniam Gurumurthy, Bangalore (IN); Sunil Mayanna, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 16/530,753

(22) Filed: Aug. 2, 2019

(65) Prior Publication Data

US 2021/0035566 A1    Feb. 4, 2021

(51) Int. Cl.
*G10L 15/187*    (2013.01)
*G10L 15/02*    (2006.01)
(Continued)

(52) U.S. Cl.
CPC ............ *G10L 15/187* (2013.01); *G10L 15/02* (2013.01); *G10L 15/04* (2013.01); *G10L 15/22* (2013.01)

(58) Field of Classification Search
CPC ....... G10L 15/00; G10L 15/005; G10L 15/01; G10L 15/02; G10L 15/04; G10L 15/18;
(Continued)

(56) References Cited

U.S. PATENT DOCUMENTS 5,329,608 A * 7/1994 Bocchieri ............. G10L 15/187
704/243
8,719,014 B2   5/2014 Wagner
(Continued)

FOREIGN PATENT DOCUMENTS

WO    2018063293 A    4/2018

OTHER PUBLICATIONS

Youssef Bassil, Paul Semaan ASR Context-Sensitive Error Correction Based on Microsoft N-Gram Dataset, Jan. 1, 2012 Journal of Computing, vol. 4 ISSN 2151-9617, pp. 34-42 (Year: 2012).*
(Continued)

*Primary Examiner* — Huyen X Vo
*Assistant Examiner* — Darioush Agahi
(74) *Attorney, Agent, or Firm* — Konrad Raynes Davda & Victor LLP; Janaki K. Davda

(57) ABSTRACT

Provided are techniques for domain specific correction of output from automatic speech recognition. An output of an automatic speech recognition engine is received. An alphanumeric sequence is extracted from the output, where the alphanumeric sequence represents an erroneous translation by the automatic speech recognition engine. Candidates for the alphanumeric sequence are generated. The candidates are ranked based on scores associated with the candidates. A candidate of the candidates having a highest score of the scores is selected. The output is corrected by replacing the alphanumeric sequence with the selected candidate. The corrected output is returned.

18 Claims, 15 Drawing Sheets

(51) Int. Cl.
*G10L 15/22* (2006.01)
*G10L 15/04* (2013.01)
(58) Field of Classification Search
CPC ....... G10L 15/187; G10L 15/22; G10L 15/24; G10L 15/26; G10L 17/00; G10L 17/16
See application file for complete search history.

(56) References Cited

U.S. PATENT DOCUMENTS

| | | | | |
|---|---|---|---|---|
| 9,190,054 | B1* | 11/2015 | Riley | G10L 15/22 |
| 9,761,222 | B1* | 9/2017 | Scarasso | G10L 15/07 |
| 10,685,669 | B1* | 6/2020 | Lan | G10L 15/1822 |
| 2003/0078778 | A1* | 4/2003 | Emam | G10L 15/26 704/E15.044 |
| 2007/0179784 | A1* | 8/2007 | Thambiratnam | G10L 15/26 704/255 |
| 2008/0126100 | A1 | 5/2008 | Grost et al. | |
| 2013/0289993 | A1 | 10/2013 | Rao | |
| 2014/0012568 | A1 | 1/2014 | Caskey et al. | |
| 2015/0095026 | A1* | 4/2015 | Bisani | H04R 3/005 704/232 |
| 2020/0082808 | A1* | 3/2020 | Li | G10L 15/10 |
| 2020/0184959 | A1* | 6/2020 | Yasa | G10L 15/1815 |
| 2020/0243094 | A1* | 7/2020 | Thomson | G10L 15/22 |
| 2020/0342860 | A1* | 10/2020 | Ju | G10L 15/26 |
| 2021/0020170 | A1* | 1/2021 | Biadsy | G10L 15/18 |

OTHER PUBLICATIONS

Eric Sven Ristad, Member, and Peter N. Yianilos Learning String-Edit Distance, May 1998, IEEE Transactions On Pattern Analysis and Machine Intelligence, vol. 20, No. 5 pp. 522-532 (Year: 1998).*

Hacker et al., "A Phonetic Similarity Based Noisy Channel Approach to ASR Hypothesis Re-Ranking and Error Detection" dated 2014, IEEE, International Conference on Acoustic, Speech and Signal Processing (ICASSP), Total 5 pages.

Jeong et al., "Using Higher-Level Linguistic Knowledge for Speech Recognition Error Correction in A Spoken q/a Dialog" dated 2004, (online) retrieved from the Internet at URL>https://www.google.com/url?sa=t&rct=j&q=&esrc=s&source. . . , Total 8 pages.

Mell et L., "Effectively and Securely Using the Cloud Computing Paradigm" dated Oct. 9, 2009, NIST, Information Technology Laboratory, Total 80 pages.

Mell et al., "The NIST Definition of Cloud Computing" dated Sep. 2011, Recommendations of the National Institute of Standards and Technology, Total 7 pages.

Wikipedia, "ARPABET" (online), retrieved from the Internet on Jun. 23, 2019, at URL>https://en.wikipedia.org/wiki/ARPABET, Total 3 pages.

Wikipedia, "CMU Pronouncing Dictionary", (online) retrieved from the internet on Jun. 23, 2019 at URL> https://en.wikipedia.org/wiki/CMU_Pronouncing_Dictionary, Total 3 pages.

Wikipedia, "Hidden Markov Model" (online) Retrieved from the Internet on Jun. 29, 2019, at URL>https://en.wikipedia.org/wiki/Hidden_Markov_model,Total 20 pages.

Skounakis et al., "Hierarchical Hidden Markov Models for Information Extraction", In Proceedings of the Eighteenth International Joint Conference on Artificial Intelligence, 2003, Total 7 pages.

Bassil et al., "ASR Context-Sensitive Error Correction Based on Microsoft N-Gram Dataset", dated Jan. 2012, Journal of Computing, vol. 4, Issue 1, Total 9 pages.

* cited by examiner

BASE CASE:
If phonetic segments of the ASR output are empty:
  ADD the current candidate to the candidates list

RECURSIVE CASE:
For each prefix segment of the phonetic segments:
    Find the alphanumeric that is phonetically similar to the prefix segment
      ADD the alphanumeric as a part of candidate
      Recurse on the suffix of the ASR's phonetic representation
      Backtrack

FIG. 5

$$P(C|A) = \frac{P(C) * P(A|C)}{P(A)} \approx P(C) * P(A|C) = 1 * P(A_1, A_2, A_3, \ldots, A_n | C_1, C_2, C_3, \ldots, C_n)$$

FIG. 10A $$P(A|C) = \sum_{i=1}^{n} x * score(A_i, C_i) \text{ where } x \text{ is the emphasis factor}$$

$$score(A_i, C_i) = \begin{cases} mean(globalCorrelation(A_i, C_i), localCorrelation(A_i, C_i)), \\ \quad \text{if mapping exists between } A_i \text{ and } C_i \\ mean(globalCorrelation(A'_i, C_i), localCorrelation(A'_i, C_i) - \text{Edit Distance}(A'_i, A_i), \\ \quad \text{if no such mapping exists} \end{cases}$$

Here $A'_i$ is the closest (in acoustic space) $A_i$ in mapping for alphanumeric $C_i$

$\alpha_0(0) = 1$ $\alpha_a(0) = 0$, if $q_a \neq q_0$ $\alpha_a(i) = \begin{cases} \alpha_{a,n}(i, |s_i|), & \text{if type } (q_a) = \text{type } (s_i) \\ \alpha_{order,n}(i, |s_i|), & \text{if type } (s_i) = \text{Alphanumeric} \\ 0, & \text{otherwise} \end{cases}$ $\alpha_{a,0}(i,0) = \sum_b T(q_a|q_b)\alpha_b(i-1)$ $\alpha_{a,b}(i,0) = 0$, if $q_{a,b} \neq q_{a,0}$ $\alpha_{a,b}(i,j) = E(s_{i,j}|q_{a,b})\sum_c T(q_{a,b}|q_{a,c})\alpha_{a,c}(i,j-1)$ Here, $s_i$: $i^{th}$ phrase in sentence s $s_j$: $j^{th}$ word in phrase $s_i$ $q_a, q_0, q_n$: $a^{th}$, start and end state of phrase HMM $\alpha_a(i)$: probability of emitting sequence of phrases $s_1,...., s_i$, Starting from start state and ending at state $q_a$ $\alpha_a, b(i,j)$: probability of emitting sequence of words $s_{1,1},...., s_{i,j}$, Starting from start state and ending at state $q_{a,b}$ $E(s_{i,j}|q_{a,b})$: probability that word state $q_{a,b}$ emits word $s_{i,j}$ $T(q_a|q_b)$: probability of transition from phrase state $q_a$ to $q_b$ $T(q_{a,b}|q_{a,c})$: probability of transition from phrase state $q_{a,c}$ to $q_{a,b}$

FIG. 10C

DOMAIN SPECIFIC CORRECTION OF OUTPUT FROM AUTOMATIC SPEECH RECOGNITION

BACKGROUND

1. Field of the Invention

Embodiments of the invention relate to domain specific correction of output from automatic speech recognition. In particular, embodiments receive the output of an Automatic Speech Recognition (ASR) engine and provide domain specific correction of that output.

2. Description of the Related Art

Speech is becoming a preferred technique for interaction in multiple applications. For example, ubiquitous devices and availability of Automatic Speech Recognition (ASR) engines have made it possible for businesses to lend their interaction services in the form of conversation, driven by the queries of the customers in spoken form.

However, the output of ASR engines may include errors. Conventional error correction techniques for the output may be described as manual error correction, error correction based on alternative hypothesis, error correction based on pattern learning, and post editing error correction. Such techniques may use a human interference. Such techniques may create a model out of a predefined vocabulary set (either dictionary words or domain specific words) or using n-gram contextual information. The search for the correct word ends after traversing a lattice of already known words from a vocabulary set and finding a replacement.

SUMMARY

In accordance with embodiments, a computer-implemented method is provided for domain specific correction of output from automatic speech recognition. The computer-implemented method comprises operations. An output of an automatic speech recognition engine is received. An alphanumeric sequence is extracted from the output, where the alphanumeric sequence represents an erroneous translation by the automatic speech recognition engine. Candidates for the alphanumeric sequence are generated. The candidates are ranked based on scores associated with the candidates. A candidate of the candidates having a highest score of the scores is selected. The output is corrected by replacing the alphanumeric sequence with the selected candidate. The corrected output is returned.

In accordance with other embodiments, a computer program product is provided for domain specific correction of output from automatic speech recognition. The computer program product comprises a computer readable storage medium having program code embodied therewith, the program code executable by at least one processor to perform operations. An output of an automatic speech recognition engine is received. An alphanumeric sequence is extracted from the output, where the alphanumeric sequence represents an erroneous translation by the automatic speech recognition engine. Candidates for the alphanumeric sequence are generated. The candidates are ranked based on scores associated with the candidates. A candidate of the candidates having a highest score of the scores is selected. The output is corrected by replacing the alphanumeric sequence with the selected candidate. The corrected output is returned.

In yet other embodiments, a computer system is provided for domain specific correction of output from automatic speech recognition. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. An output of an automatic speech recognition engine is received. An alphanumeric sequence is extracted from the output, where the alphanumeric sequence represents an erroneous translation by the automatic speech recognition engine. Candidates for the alphanumeric sequence are generated. The candidates are ranked based on scores associated with the candidates. A candidate of the candidates having a highest score of the scores is selected. The output is corrected by replacing the alphanumeric sequence with the selected candidate. The corrected output is returned.

BRIEF DESCRIPTION OF THE SEVERAL VIEWS OF THE DRAWINGS

Referring now to the drawings in which like reference numbers represent corresponding parts throughout:

FIG. 5 illustrates pseudocode for a recursive formula for generating the list of candidates in accordance with certain embodiments.

FIG. 10A illustrates calculation of a probability $P(C|A)$ in accordance with certain embodiments.

FIG. 10B illustrates calculation of a probability $P(A|C)$ in accordance with certain embodiments.

FIG. 10C illustrates an example modification 1020 to the forward technique equations in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
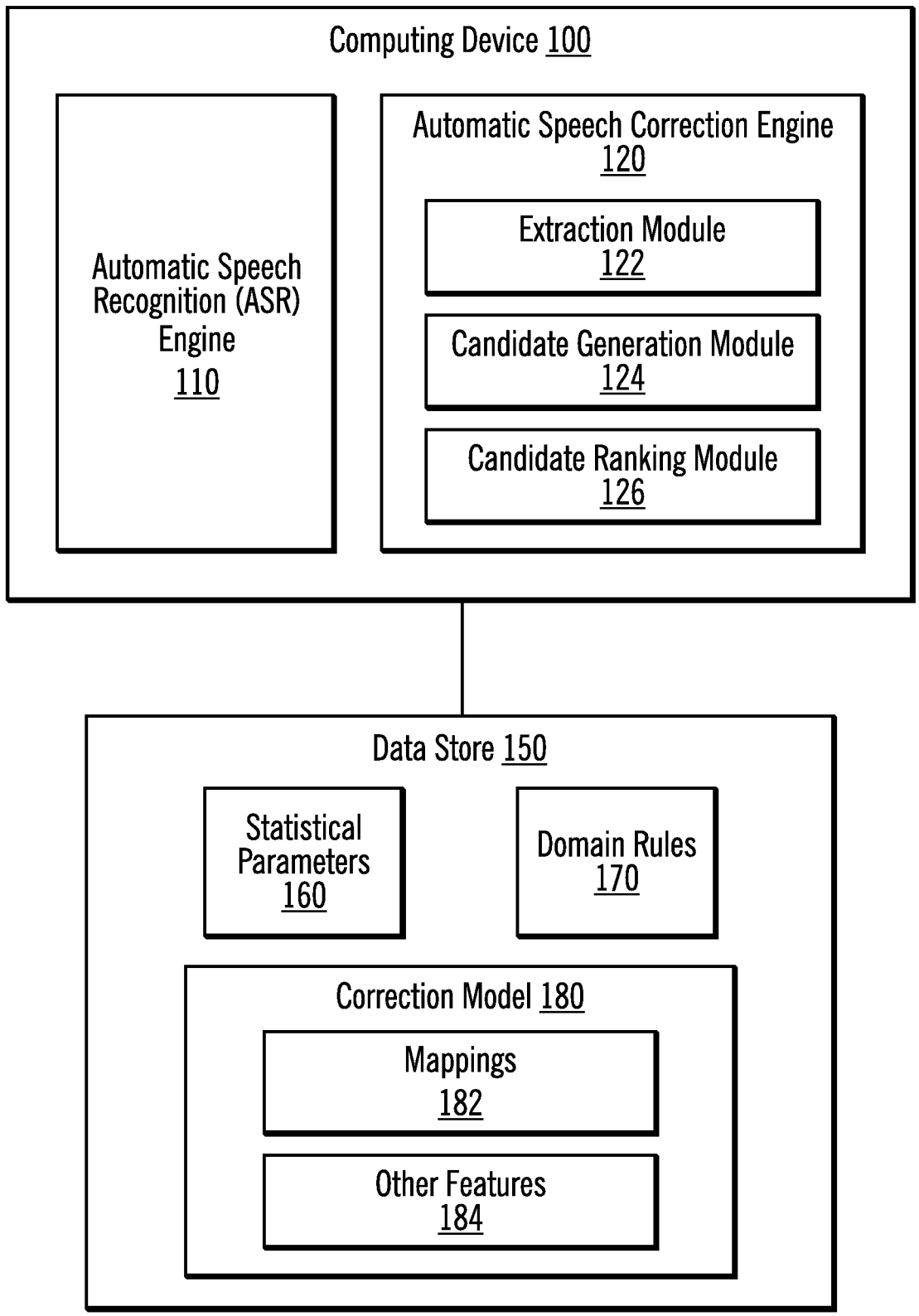
FIG. 1 illustrates, in a block diagram, a computing environment in accordance with certain embodiments.

FIG. 1 illustrates, in a block diagram, a computing environment in accordance with certain embodiments. In FIG. 1, a computing device 100 is coupled to a data store 150. The computing device 100 includes an Automatic Speech Recognition (ASR) engine 110 and an automatic speech correction engine 120. The data store 150 stores statistical parameters 160, domain rules 170, and a correction model 180.

In certain embodiments, the automatic speech correction engine 120 includes an extraction module 122, a candidate generation module 124, and a candidate ranking module 126.

The correction model 180 is trained using mappings 182 and other features 184. In certain embodiments, based on an input of an alphanumeric sequence that represents an erroneous translation by the ASR engine 110, the correction model 180 outputs a list of candidates and associated scores. These scores may be adjusted based on the statistical parameters 160 and the domain rules 170. In certain embodiments, the correction model 180 learns mappings 182 of the alphanumeric sequence and different ways that the alphanumeric sequence sounds, incorporating other features 184, such as noise and different accents of users, that lead to the erroneous translation in the output.

In certain embodiments, the domain rules 170 consist of rules driven by business knowledge. For example, business knowledge may indicate that a Stock Keeping Unit (SKU) of 16 characters consists of: a 6 character manufacturer code, a 2 character lot code, a 6 character product code, and a 2 character variation code. Such business knowledge helps the automatic speech correction engine 120 ascertain pauses, identify lengths of character sequences amidst regular language, use sub-lengths to establish transitions, and rank the candidates.

In certain embodiments, the statistical parameters 160 include: a) a correlation of each phonetic sound to the possible characters in the corpus (i.e., a local correlation) and b) an occurrence of each phonetic sound in the entire corpus (i.e., a global correlation).

The ASR engine 110 converts spoken words and alphanumeric sequences into text that is output. However, the output may contain alphanumeric sequences that represent erroneous translation by the ASR engine 110. The automatic speech correction engine 120 corrects these erroneous translations. An alphanumeric sequence may be described as any non-dictionary sequence of characters. For example, the alphanumeric sequence may include any combination of alphabetic characters, numeric characters, special characters (e.g., hyphens), symbols, blank spaces, etc. (e.g., an alphanumeric sequence may have all numbers, all alphabetic characters, a combination of numbers and alphabetic characters, etc.). For example, in the query "Where is my order number excite 4 ate?", the alphanumeric sequence that represents an erroneous translation is: "excite 4 ate", which includes alphabetic characters, blank spaces, and a number character.

In many cases, small errors detected in the output from the ASR engine 110 don't matter much as they don't change the meaning of the overall sentences, but there may be certain portions of the speech whose correctness and accuracy is important. Usually, important alphanumeric sequences include order numbers, addresses, phone numbers, and other character or number sequences that are not dictionary words. Some applications rely on such important alphanumeric sequences being correct.

These important alphanumeric sequences may vary depending on the application. For example, for an e-commerce domain, a user may inquire about an order by order number or item number, and, if the order number or item number itself is erroneously captured, the application cannot proceed further to handle the request of the user. The automatic speech correction engine 120 is able to correct erroneously captured out of dictionary words output form an ASR engine 110.

With embodiments, the automatic speech correction engine 120 is able to handle errors in alphanumeric sequences. The inherent nature of alphanumeric sequences is that they are context and domain independent. Moreover, their likelihood of co-occurrence with previous or succeeding words often cannot be defined. Also, the automatic speech correction engine 120 enhances the accuracy of recognizing alphanumeric sequences of the speech.

In certain embodiments, the automatic speech correction engine 120 corrects the output of the ASR engine 110 without reference to original sound.

In certain embodiments, first, the automatic speech correction engine 120 generates a list of candidates that may be the actual alphanumeric sequence spoken by a user. The automatic speech correction engine 120 uses phonetic similarity for generating candidates. In such embodiments, second, the automatic speech correction engine 120 ranks the candidates on the list and selects a candidate. The automatic speech correction engine 120 may use machine learning techniques to find a score for each candidate and rank the candidates according to each score. With embodiments, the automatic speech correction engine 120 corrects the erroneous alphanumeric recognition by the ASR with a high accuracy. If additional business knowledge is available via the domain rules 170, then the automatic speech correction engine 120 may use this additional business knowledge to further improve the accuracy.

With embodiments, the automatic speech correction engine 120 is not language dependent. Therefore, the automatic speech correction engine 120 may be used for any spoken language, given that a dictionary exists that maps the words in that language to phoneme sets.

In certain embodiments, the automatic speech correction engine 120 provides a domain independent technique based on phonetic similarity for enumerating non-dictionary words (alphanumeric words) in output by the ASR engine 110. In certain embodiments, the automatic speech correction engine 120 enumerates a few probable candidates from an exponentially large search space of possible alphanumeric sequences. A machine learning approach for learning various irregularities (e.g., background noise, multiple accents, etc.) that cause the ASR engine 110 to misinterpret alphanumeric sequences and output errors. Th automatic speech correction engine 120 may store the information that is learned in the form of mappings and may use statistical parameters learned from them to reverse these irregularities to get back the intended alphanumeric sequence. The automatic speech correction engine 120 combines the statistical parameters learned from the data in order to accurately rank the candidates. In certain embodiments, the accuracy of ranking is improved by using the following heuristics: an emphasis factor to boost the weightage of the first spoken syllable after a pause in the spoken alphanumeric sequence, taking both global and location correlation of the alphanumeric sequence and the distorted phonetic of the ASR engine 110 output, and penalizing candidates that don't have a correlation in the mappings learnt from data.

In certain embodiments, the automatic speech correction engine 120 provides a domain independent technique for correcting the output of the ASR engine 110 for alphanumeric sequences by identifying replacement candidates based on phonetic similarity of alphanumeric character sequences and using a multi-segment comparison approach along with an iterative prefix segment extraction technique.

In certain embodiments, the automatic speech correction engine 120 uses a fuzzy logic technique that models alphanumeric noise and accent variations in speech to further evaluate and reverse errors in the output of the ASR engine 110 for alphanumeric sequences. The fuzzy logic technique uses heuristics to determine an emphasis factor to use higher weightage for a first spoken syllable after a configurable pause in a spoken sequence, applies a combination of global and local correlation techniques to perform correction of distorted phonetic output, and further penalizes candidates without correlation in mappings learnt from training data.

Figure 2:
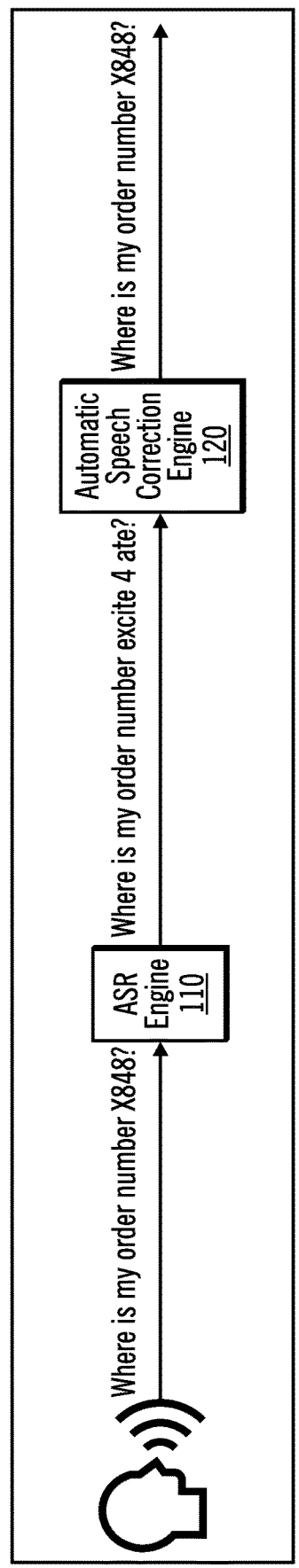
FIG. 2 illustrates an example of correction of output of an ASR engine in accordance with certain embodiments.

FIG. 2 illustrates an example of correction of output of the ASR engine 110 in accordance with certain embodiments. In FIG. 2, a user speaks "Where is my order number X848"?, which is input to the ASR engine 120. The ASR engine 120 coverts the input to text and outputs "Where is my order number excite 4 ate?". The output of the ASR engine 120 is input to the automatic speech correction engine 120, which corrects the error to output "Where is my order number X848?".

With embodiments, given output of the ASR engine 110 of any sentence or query containing an alphanumeric sequence from a general speech to text conversion, the automatic speech correction engine 120 corrects the alphanumeric sequence that has been erroneously captured as words. With embodiments, the input to the automatic speech correction engine 120 is the text output of the ASR engine 110, and the output of the automatic speech correction engine 120 is the most likely alphanumeric that was spoken as input to the ASR engine 110.

Figure 3:
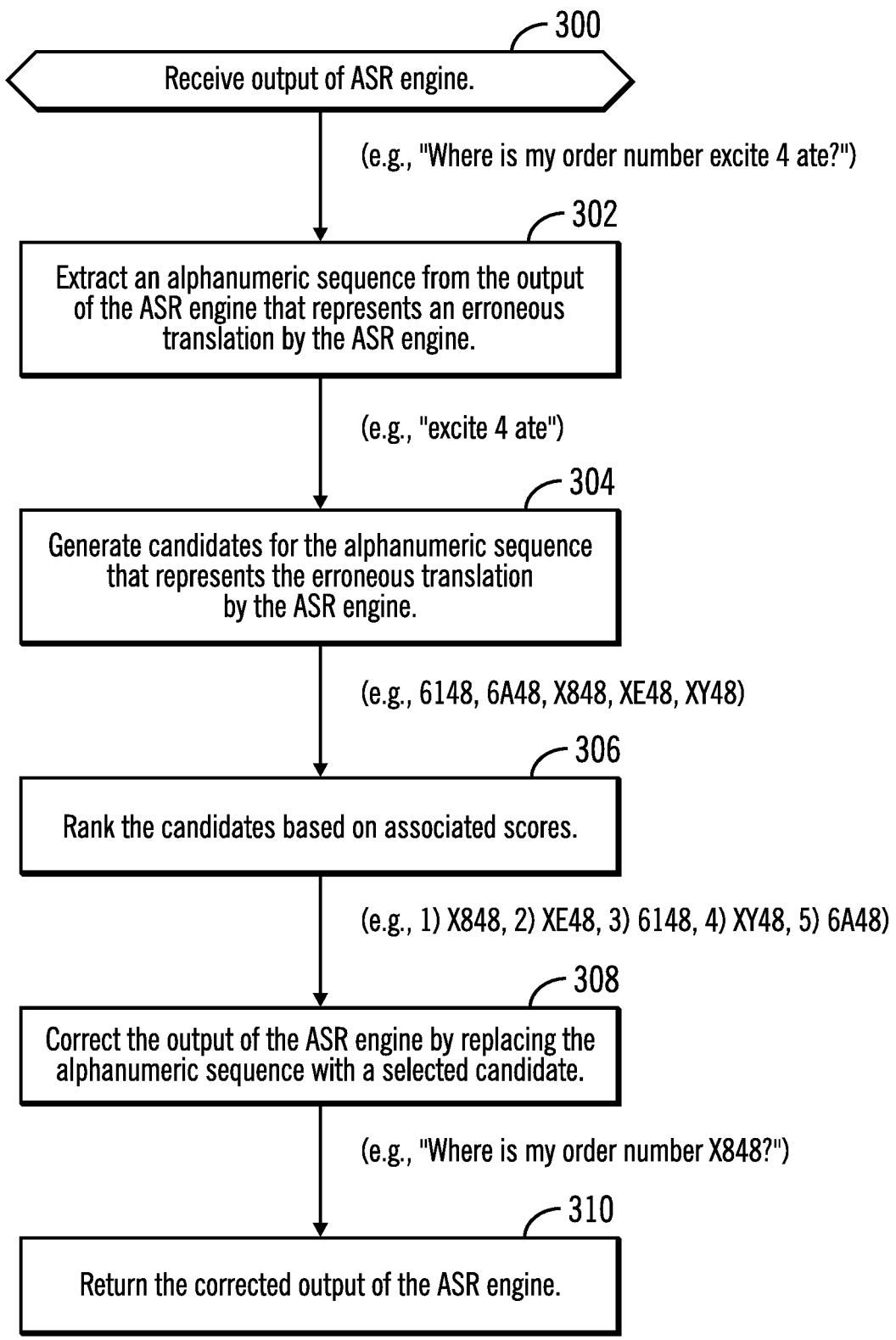
FIG. 3 illustrates, in a flowchart, operations for correcting output of an ASR engine in accordance with certain embodiments.

FIG. 3 illustrates, in a flowchart, operations for correcting output of an ASR engine in accordance with certain embodiments. Control begins at block 300 with the automatic speech correction engine 120 receiving output of the ASR engine 110 (e.g., "Where is my order number excite 4 ate?"). In block 302, the automatic speech correction engine 120 extracts an alphanumeric sequence from the output of the ASR engine 110 (e.g., "excite 4 ate"), where the alphanumeric sequence represents an erroneous translation by the ASR engine 110. In certain embodiments, multiple, alphanumeric sequences are found that represent erroneous translations, and the automatic speech correction engine 120 performs the processing of blocks 304-308 on each of these before outputting the corrected output in block 310.

In block 304, the automatic speech correction engine 120 generates candidates (e.g., 6148, 6A48, X848, XE48, XY48). In block 306, the automatic speech correction engine 120 ranks the candidates (e.g., 1) X848, 2) XE48, 3) 6148, 4) XY48, 5) 6A48). In block 308, the automatic speech correction engine 120 corrects the output of the ASR engine 110 (e.g., "Where is my order number X848?") by replacing the alphanumeric sequence with a selected candidate. In certain embodiments, the automatic speech correction engine 120 corrects the output of the ASR engine 110 by replacing the probable alphanumeric sequence with the highest ranked candidate. In block 310, the automatic speech correction engine 120 returns the corrected output of the ASR engine. Initially, the ASR engine 110 may have received a voice communication regarding some transaction (e.g., looking up an invoice, accessing an account, placing an order, etc.), and the corrected output is used to complete the transaction.

In certain embodiments, the automatic speech correction engine 120 includes an extraction module 122, a candidate generation module 124, and a candidate ranking module 126. The extraction module 122 extracts the alphanumeric sequence from the output (e.g., a sentence or a query) of the ASR engine 110. The candidate generation module 124 finds a list of candidates, which are close to (in acoustic space) erroneously detected words. The candidate ranking module 126 ranks the candidates based on statistical parameters learnt from the data. Then, the most likely candidate is added back in the appropriate location in the output of the ASR engine 110 and returned.

Figure 4:
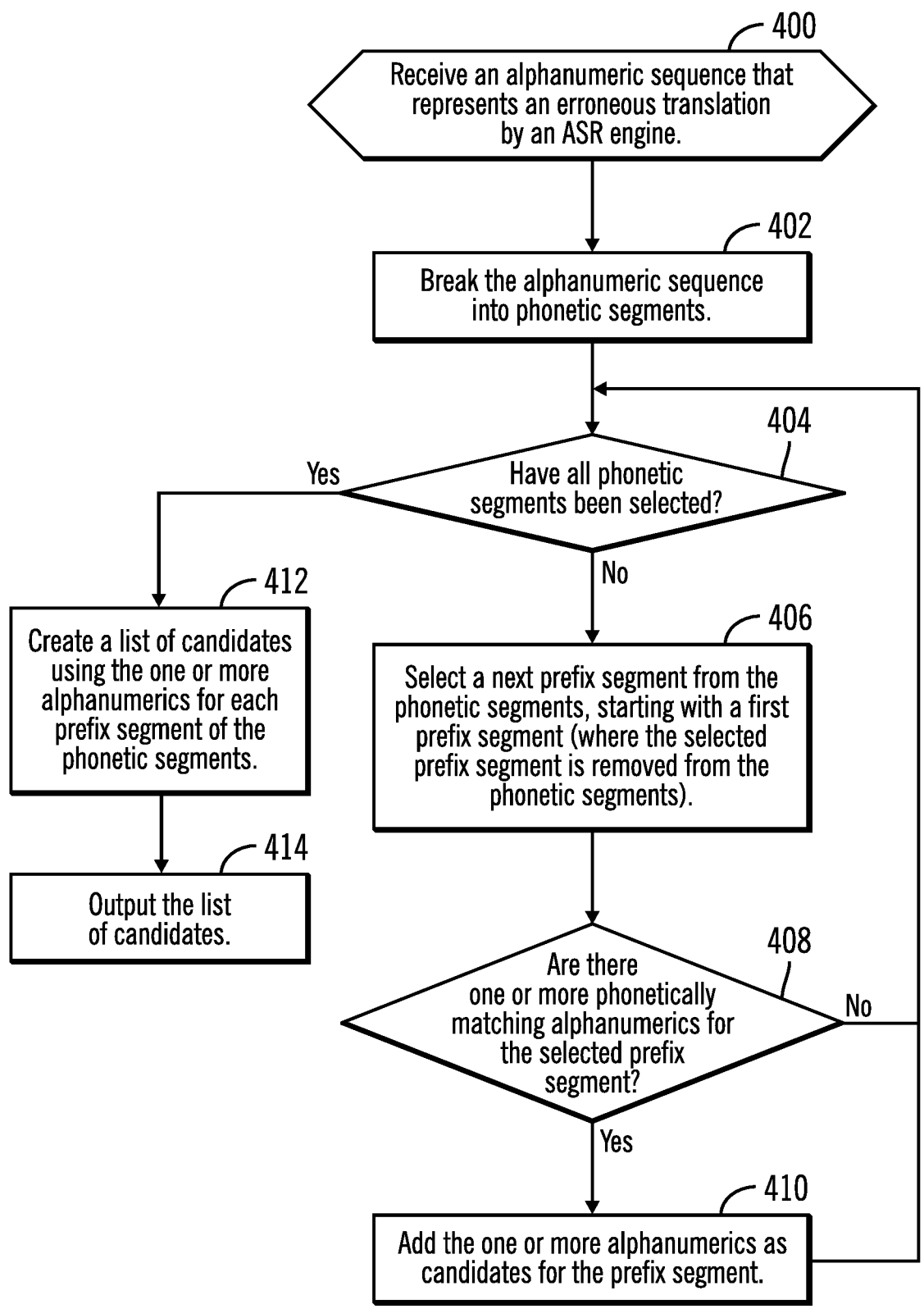
FIG. 4 illustrates, in a flowchart, operations for generating a list of candidates in accordance with certain embodiments.

FIG. 4 illustrates, in a flowchart, operations for generating a list of candidates in accordance with certain embodiments. The processing of FIG. 4 may be performed by a candidate generation module of the automatic speech correction engine 120.

Control begins at block 400 with the automatic speech correction engine 120 receiving an erroneous alphanumeric sequence that represents an erroneous translation by an ASR engine. In block 402, the automatic speech correction engine 120 breaks the alphanumeric sequence into phonetic segments. In block 404, the automatic speech correction engine 120 determines whether all phonetic segments been selected. If so, processing continues to block 412, otherwise, processing continues to block 406.

In block 406, the automatic speech correction engine 120 selects a next prefix segment from the phonetic segments, starting with a first prefix segment (where the selected prefix segment is removed from the phonetic segments). In block 408, the automatic speech correction engine 120 determines whether there are one or more phonetically matching alphanumerics for the selected prefix segment. If so, processing continues to block 410, otherwise, processing loops back to block 404. In certain embodiments, if no phonetically matching alphanumeric is found for the selected prefix segment, then the prefix segment itself is used for creating the list of candidates in block 412. In block 410, the automatic speech correction engine 120 adds the one or more alphanumerics as candidates for the prefix segment. For example, for a prefix segment of "excite", the alphanumerics may be: X8, XE, 61, XY or 6A. From block 410, processing continues to block 404.

In block 412, the automatic speech correction engine 120 creates a list of candidates using the one or more alphanumerics for each segment of the phonetic segments. In block 414, the automatic speech correction engine 120 outputs the list of candidates.

Thus, the automatic speech correction engine 120 enumerates the likely candidates that are phonetically similar to the prefix segments through a recursive process.

FIG. 5 illustrates pseudocode for a recursive formula for generating the list of candidates in accordance with certain embodiments. The automatic speech correction engine 120 uses the set of phonemes for both the output of the ASR engine 110 (ASR's phonetic representation) and the alphanumeric. A phoneme may be described as a unit of sound. Any word may be broken down into a sequence of phonemes based on its sound, irrespective of the language. ARPABET is one of the phonetic transcription techniques that helps in representing the phoneme sequence of a word. A dictionary may be built with mappings of words/letters in a language and their phonetic representation. CMPU pronouncing dictionary (CMUdict) is an example of a dictionary that contains mappings of words/letters in English and their phonetic representation using ARPABET. Hence, if a dictionary exists for any language that maps the words in that language to a phoneme set, the automatic speech correction engine 120 generates appropriate candidates using such a dictionary.

Figure 6A:
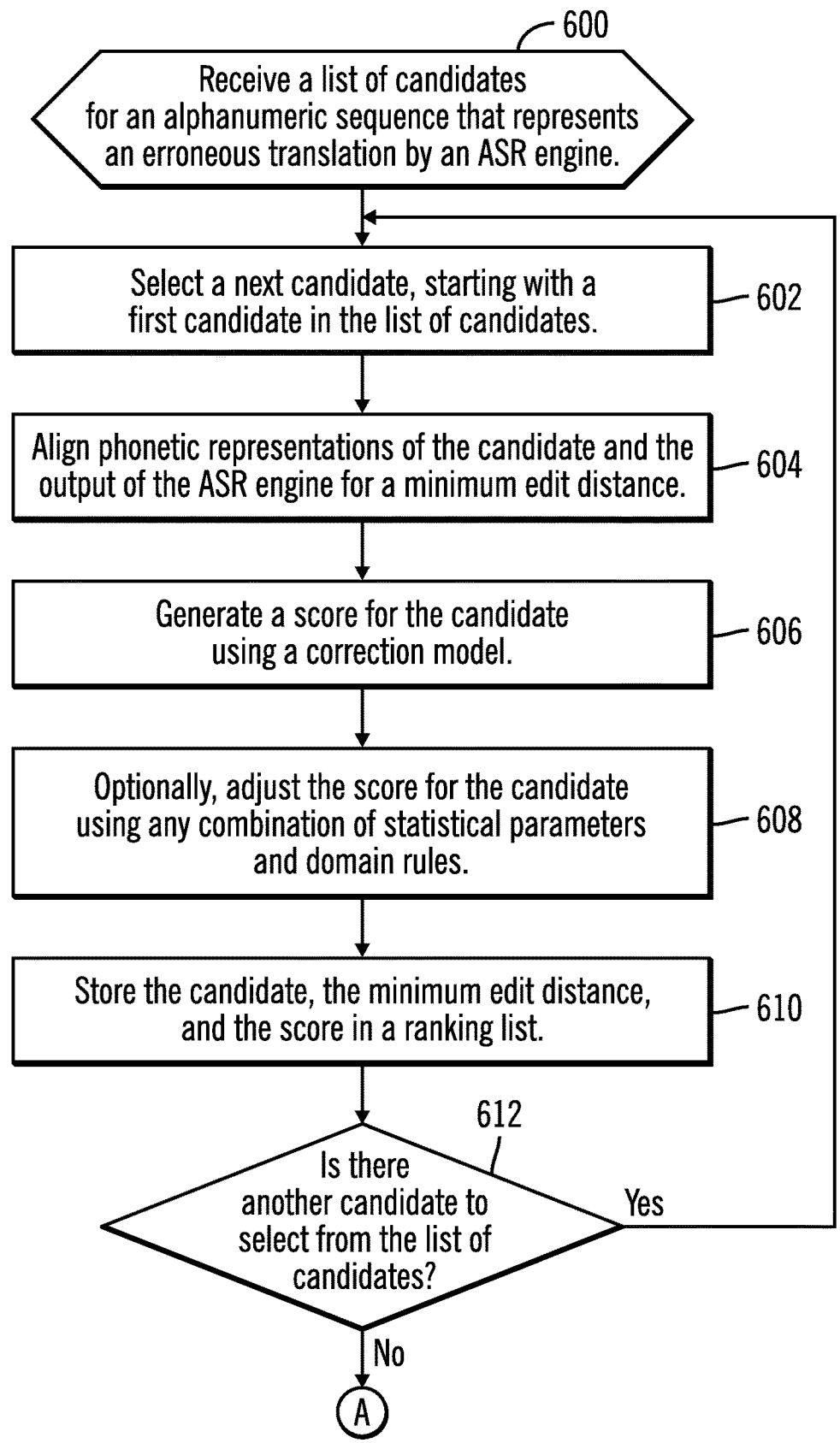
FIGS. 6A and 6B illustrate, in a flowchart, operations for ranking candidates on the list of candidates and selecting a candidate from the list of candidates in accordance with certain embodiments.
Figure 6B:
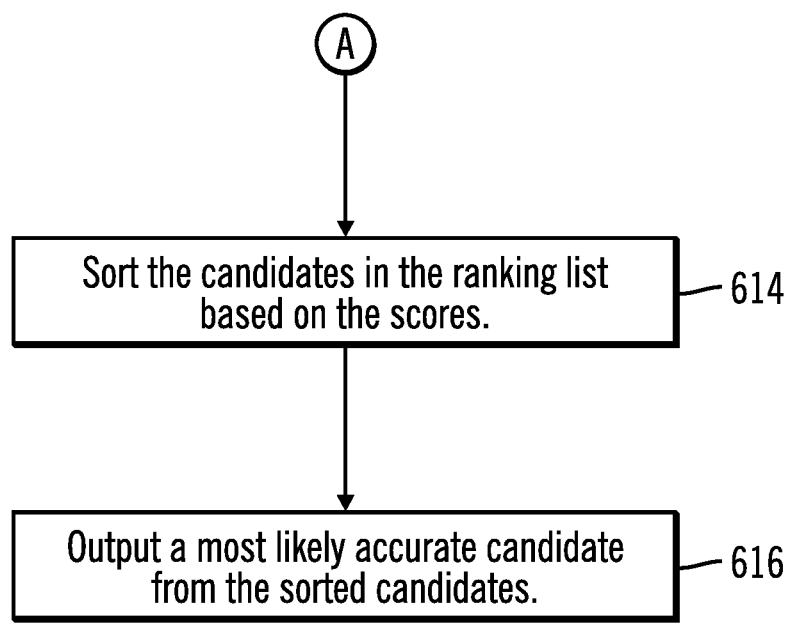

FIGS. 6A and 6B illustrate, in a flowchart, operations for ranking candidates on the list of candidates and selecting a candidate from the list of candidates in accordance with certain embodiments. Control begins at block 600 with the automatic speech correction engine 120 receiving a list of candidates for the alphanumeric sequence that represents an erroneous translation by an ASR engine. In block 602, the automatic speech correction engine 120 selects a next candidate, starting with a first candidate in the list of candidates. In block 604, the automatic speech correction engine 120 aligns phonetic representations of the candidate and the output of the ASR engine for minimum edit distance (e.g., excite=X8 is close and has a small edit distance). The operations of block 604 may be described as the process of aligning the candidate's phonetic representation to the original ASR output to determine their closeness. Edit distance may be described as the number of changes (inserts, updates or deletions) to get from the original ASR output to the candidate.

In block 606, the automatic speech correction engine 120 generates a score for the candidate using the correction model. In block 608, the automatic speech correction engine 120, optionally adjusts the score for the candidate using any combination of statistical parameters 160 and domain rules 170. In certain embodiments, based on an input of the candidate alphanumeric sequence that represents an erroneous translation by the ASR engine 110, the correction model 180 outputs a score for the candidate (i.e., a probability of how likely the candidate is accurate for the asynchronous sequence that represents the erroneous translation). Then, the score may be adjusted based on the statistical parameters 160 and the domain rules 170. In certain additional embodiments, the score is based on any combination of the statistical parameters 160, the domain rules 170, and the correction model 180.

In block 610, the automatic speech correction engine 120 stores the candidate, the minimum edit distance, and the score in a ranking list. In block 612, the automatic speech correction engine 120 determines whether there is another candidate to select from the list of candidates. If so, processing continues to block 602, otherwise, processing continues to block 614 (FIG. 6B).

In block 614, the automatic speech correction engine 120 sorts the candidates in the ranking list based on the scores. In block 616, the automatic speech correction engine 120 outputs a most likely accurate candidate from the sorted candidates. In certain embodiments, the candidate with the highest score is output. In certain embodiments, the score and the minimum edit distance are used to select the most likely accurate candidate from the sorted candidates. For example, if multiple candidates have similar scores, the automatic speech correction engine 120 may select the one of the multiple candidates that has a smaller minimum edit distance. In certain embodiments, once closeness is established using edit distance, then additional techniques (statistical parameters, domain rules and machine learning model's outputs) may be used to rank the candidates.

In certain embodiments, the automatic speech correction engine 120 gives each of the candidates a likelihood score of being the actual alphanumeric spoken. For this, the automatic speech correction engine 120 trains a correction model with the pairs of erroneous phonetic representations output by the ASR engine 110 and the correct intended alphanumeric sequence. The correction model 180 learns the mappings 182 between an alphanumeric sequence and various ways that the alphanumeric sequence may sound, incorporating other features 184, such as the noise, different accents of users, and any features that make alphanumeric sequences to be erroneously translated by the ASR engine 110. The mappings 182 may be built either using neural networks or simple dynamic programming alignment of input data. The correction model 180 learns various phonetic representations of the alphanumeric sequences. These phonetic representations are tolerant of irregularities, such as background noise, different accents, etc. Once the mappings are available, along with statistical parameters, the automatic speech correction engine 120 ranks the candidates. Suppose the output of the ASR engine 110 is A and one candidate is C, then, the automatic speech correction engine 120 computes the likelihood of this candidate given this ASR output or equivalently, $P(C|A)$. FIG. 10A illustrates an example calculation 1000 of a probability $P(C|A)$ in accordance with certain embodiments.

The alphanumeric sequence and the candidates are broken into their corresponding phoneme sets and are aligned using dynamic programming. FIG. 10B illustrates an example calculation 1010 of a probability $P(A|C)$ in accordance with certain embodiments.

The emphasis factor boosts the weightage of the first spoken syllable after a pause in the spoken sequence. This is done to give greater confidence to the initial phonetics made by a user to speak an alphanumeric.

The score is computed based on a mean of global correlation and local correlation (statistical parameters 160) of the alphanumeric with the aligned segment of the phonetic representation by the ASR engine 110. Global correlation factors in the significance of this mapping across alphanumerics. Local correlation factors in the significance of this mapping among the mappings within this specific alphanumeric Ci. A penalty is levied for an association that does not appear in the mapping learnt from the data.

In certain embodiments, the alphanumeric sequence extraction is based on a hierarchical Hidden Markov Model (HMM). In certain embodiments, the automatic speech correction engine 120 uses the hierarchical HMM to extract alphanumeric sequences from the output of the ASR engine 110 that were erroneously translated. Then, the automatic speech correction engine 120 uses the correction model 180 to correct these alphanumeric sequences that were erroneously translated by the ASR engine 110.

Figure 7:
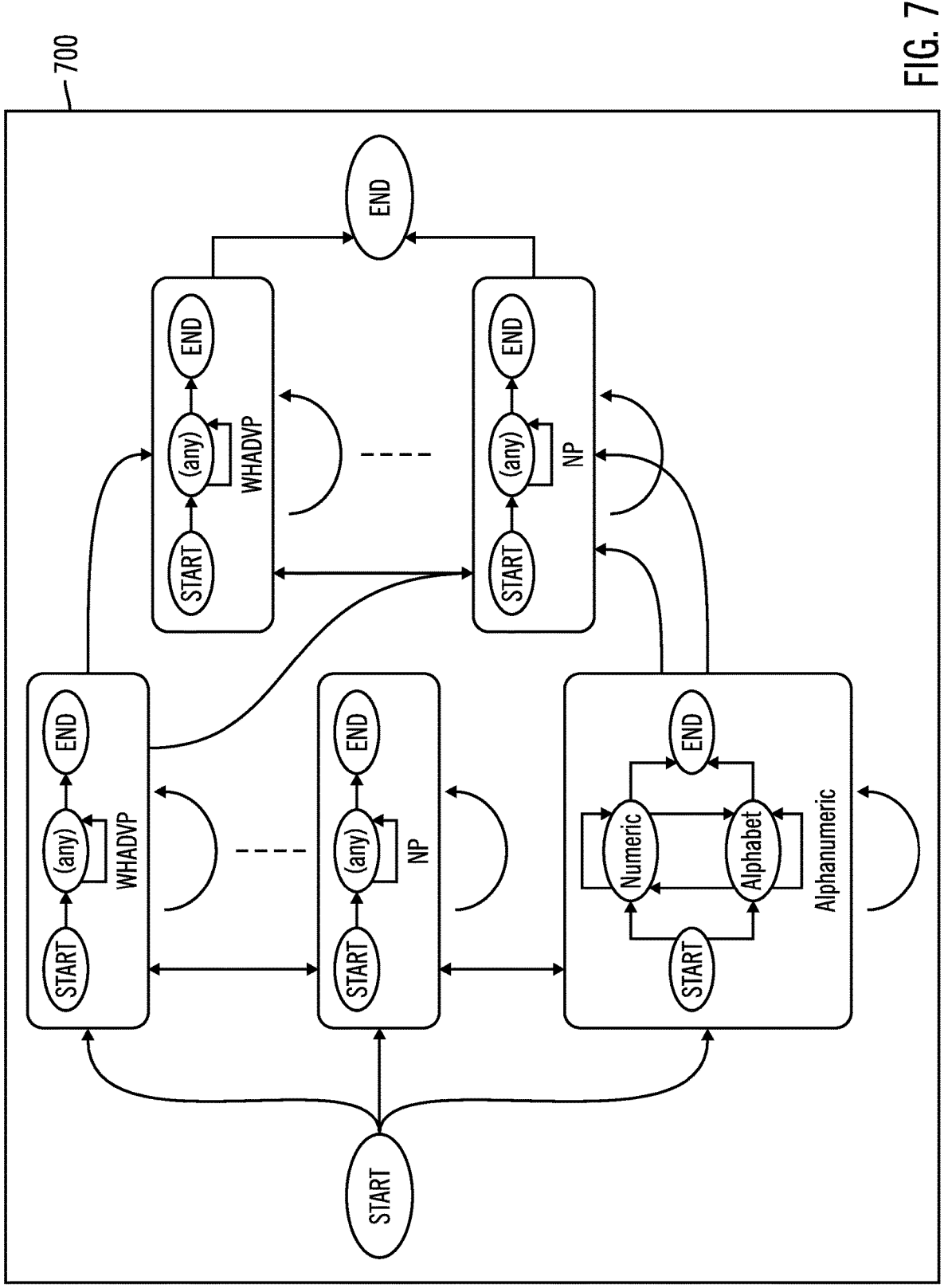
FIG. 7 illustrates a top-level architecture for a hierarchical Hidden Markov Models (HMM) in accordance with certain embodiments.

FIG. 7 illustrates a top-level architecture 700 for a hierarchical HMM in accordance with certain embodiments. The hierarchical HMM consists of two levels: a top-level phrase HMM, whose states emit phrases, and a low-level word HMM, whose states emit words. A wh-element may be described as a subordinate clause that's introduced by one of the wh-words (what, who, which, when, where, why, how). In FIG. 7, WHADVP represents a word adverb phrase of a wh-element, and NP represents a noun phrase. The phrase state with the alphanumeric is referred to as an extraction state. In addition, SQ represents a yes/no question.

Figure 8A:
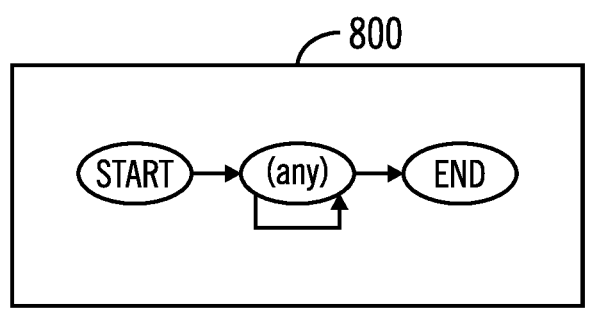
FIG. 8A illustrates an example architecture 800 of a word HMM for non-extraction states in accordance with certain embodiments.
Figure 8B:
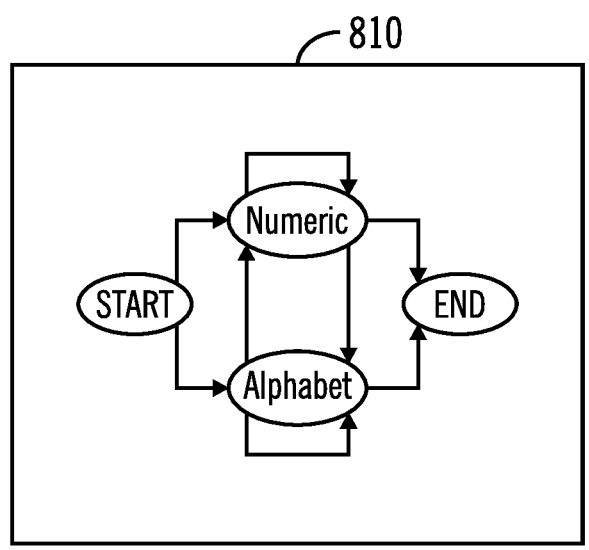
FIG. 8B illustrates an example architecture 810 for extraction states in accordance with certain embodiments.

FIG. 8A illustrates an example architecture 800 of a word HMM for non-extraction states in accordance with certain embodiments. Here the states of the word HMM may emit words of any type (e.g., words of any part of speech). FIG. 8B illustrates an example architecture 810 for extraction states in accordance with certain embodiments. Here, states of the word MINI may emit words that are a sequence of numbers or characters or both.

In certain embodiments, the training process may be performed using dynamic programming approaches used to train HMMs, such as forward, backward and Viterbi techniques with modifications to accommodate multiple levels in the HMM and extraction specific states (alphanumeric). For training, embodiments feed the model with a large number of sentences and queries containing alphanumeric sequences within them. They are tagged at both phrase level and word level. FIG. 10C illustrates an example modification 1020 to the forward technique equations in accordance with certain embodiments. The backward and Viterbi techniques may be modified in a similar way.

Figure 9:
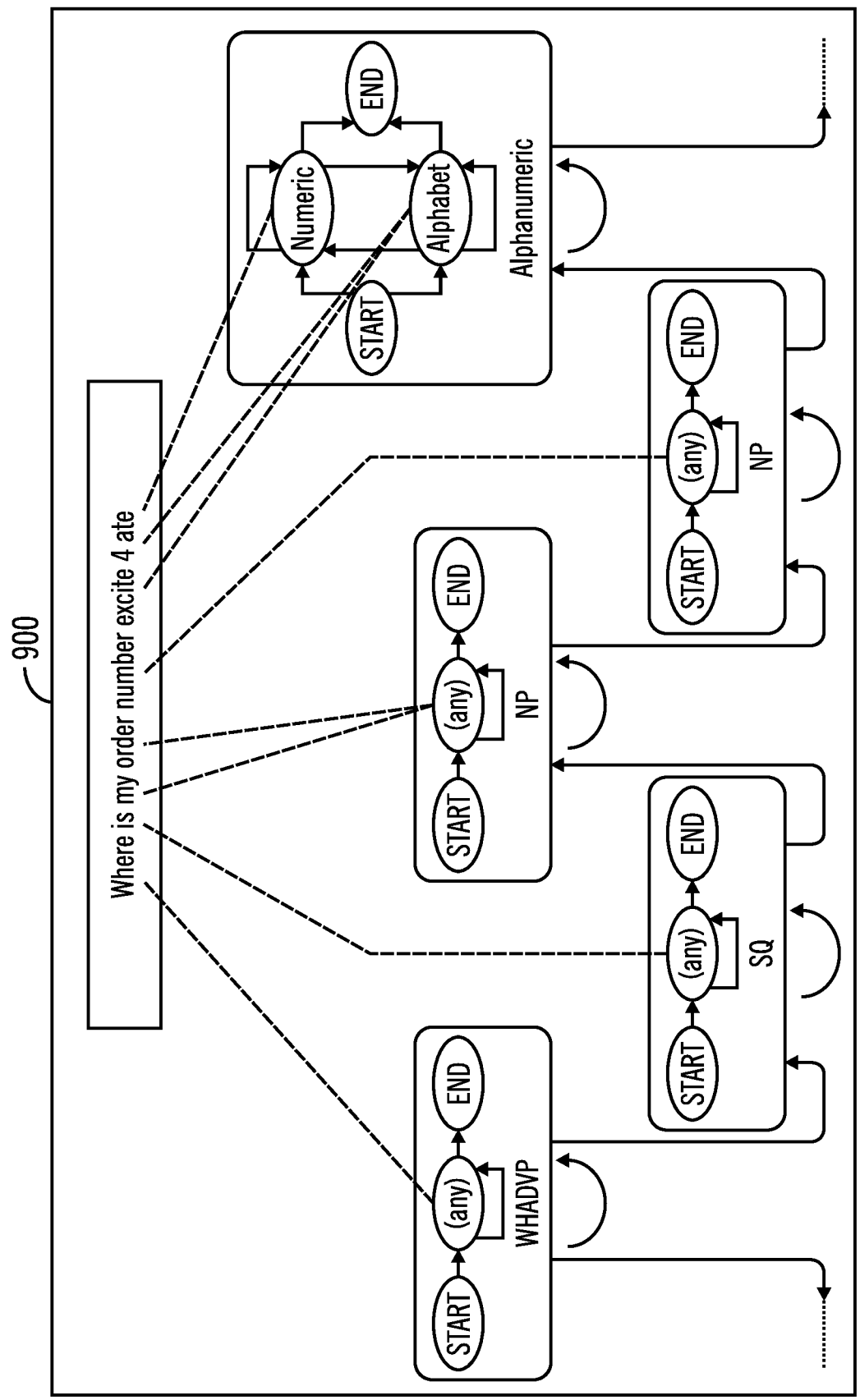
FIG. 9 illustrates extraction of an alphanumeric part from the query: "Where is my order number excite for ate" in accordance with certain embodiments.

FIG. 9 illustrates extraction of an alphanumeric part from the query: "Where is my order number excite for ate" in accordance with certain embodiments. FIG. 9 illustrates a most likely path taken to tag the query. Bold transitions between the states denote the most likely path. Dashed lines connect each state with words that the state emits. The outer boxes represent the phrase level states (WHADVP, SQ, NP, Alphanumeric, etc.) and the transitions inside the boxes represent the word level states and transitions between them. I this example, the extracted alphanumeric is "excite 4 ate". This technique may be used to find probable locations of an alphanumeric part within a sentence or query.

Unlike conventional systems that depend on language lexicon and domain knowledge represented through dictionaries and other established lexicons, the automatic speech correction engine 120 is independent of such a lexicon.

Unlike conventional systems that fail to recognize or have high error rates for alphanumeric speech patterns, the automatic speech correction engine 120 performs well for alphanumeric patterns.

Unlike conventional systems that use confidence scoring mechanisms that rely on similarity or frequency with respect to a standard lexicon, the automatic speech correction engine 120 provides a short list of candidates and scores them for similarity based on alphanumeric phonetic combinations.

Unlike conventional systems for alphanumeric speech recognition that have an exponential order of complexity, the automatic speech correction engine 120 narrows down candidates in polynomial time complexity, suitable for real time processing of the ASR engine 110 output.

Embodiments are applicable to conversational systems for robotic process automation and Business Process Automation (BPA) that involves human to machine and machine to machine sound-based interactions across distribution, insurance, finance and other industries.

With embodiments. the automatic speech correction engine 120 does not need the original spoken sentence or sequence.

Figure 11:
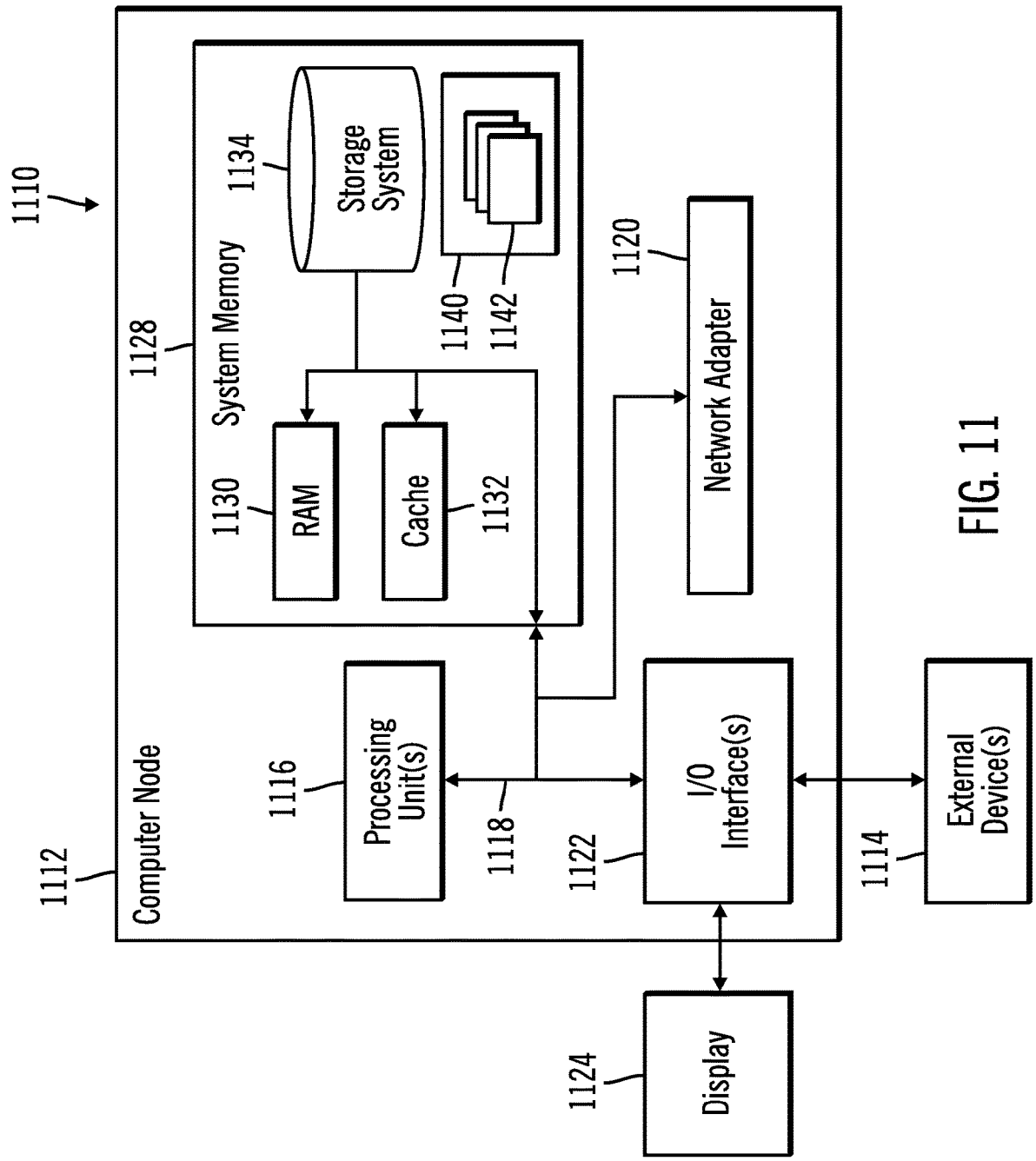
FIG. 11 illustrates a computing node in accordance with certain embodiments.

FIG. 11 illustrates a computing environment 1110 in accordance with certain embodiments. In certain embodiments, the computing environment is a cloud computing environment. Referring to FIG. 11, computer node 1112 is only one example of a suitable computing node and is not intended to suggest any limitation as to the scope of use or functionality of embodiments of the invention described herein. Regardless, computer node 1112 is capable of being implemented and/or performing any of the functionality set forth hereinabove.

The computer node 1112 may be a computer system, which is operational with numerous other general purpose or special purpose computing system environments or configurations. Examples of well-known computing systems, environments, and/or configurations that may be suitable for use with computer node 1112 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 1112 may be described in the general context of computer system executable instructions, such as program modules, being executed by a computer system. Generally, program modules may include routines, programs, objects, components, logic, data structures, and so on that perform particular tasks or implement particular abstract data types. Computer node 1112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer node 1112 is shown in the form of a general-purpose computing device. The components of computer node 1112 may include, but are not limited to, one or more processors or processing units 1116, a system memory 1128, and a bus 1118 that couples various system components including system memory 1128 to one or more processors or processing units 1116.

Bus 1118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 1112 typically includes a variety of computer system readable media. Such media may be any available media that is accessible by computer node 1112, and it includes both volatile and non-volatile media, removable and non-removable media.

System memory 1128 can include computer system readable media in the form of volatile memory, such as random access memory (RAM) 1130 and/or cache memory 1132. Computer node 1112 may further include other removable/non-removable, volatile/non-volatile computer system storage media. By way of example only, storage system 1134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD- ROM, DVD-ROM or other optical media can be provided. In such instances, each can be connected to bus 1118 by one or more data media interfaces. As will be further depicted and described below, system memory 1128 may include at least one program product having a set (e.g., at least one) of program modules that are configured to carry out the functions of embodiments of the invention.

Program/utility 1140, having a set (at least one) of program modules 1142, may be stored in system memory 1128 by way of example, and not limitation, as well as an operating system, one or more application programs, other program modules, and program data. Each of the operating system, one or more application programs, other program modules, and program data or some combination thereof, may include an implementation of a networking environment. Program modules 1142 generally carry out the functions and/or methodologies of embodiments of the invention as described herein.

Computer node 1112 may also communicate with one or more external devices 1114 such as a keyboard, a pointing device, a display 1124, etc.; one or more devices that enable a user to interact with computer node 1112; and/or any devices (e.g., network card, modem, etc.) that enable computer node 1112 to communicate with one or more other computing devices. Such communication can occur via Input/Output (I/O) interfaces 1122. Still yet, computer node 1112 can communicate with one or more networks such as a local area network (LAN), a general wide area network (WAN), and/or a public network (e.g., the Internet) via network adapter 1120. As depicted, network adapter 1120 communicates with the other components of computer node 1112 via bus 1118. It should be understood that although not shown, other hardware and/or software components could be used in conjunction with computer node 1112. Examples, include, but are not limited to: microcode, device drivers, redundant processing units, external disk drive arrays, RAID systems, tape drives, and data archival storage systems, etc.

In certain embodiments, the computing device 100 has the architecture of computer node 1112. In certain embodiments, the computing device 100 is part of a cloud infrastructure. In certain alternative embodiments, the computing device 100 is not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
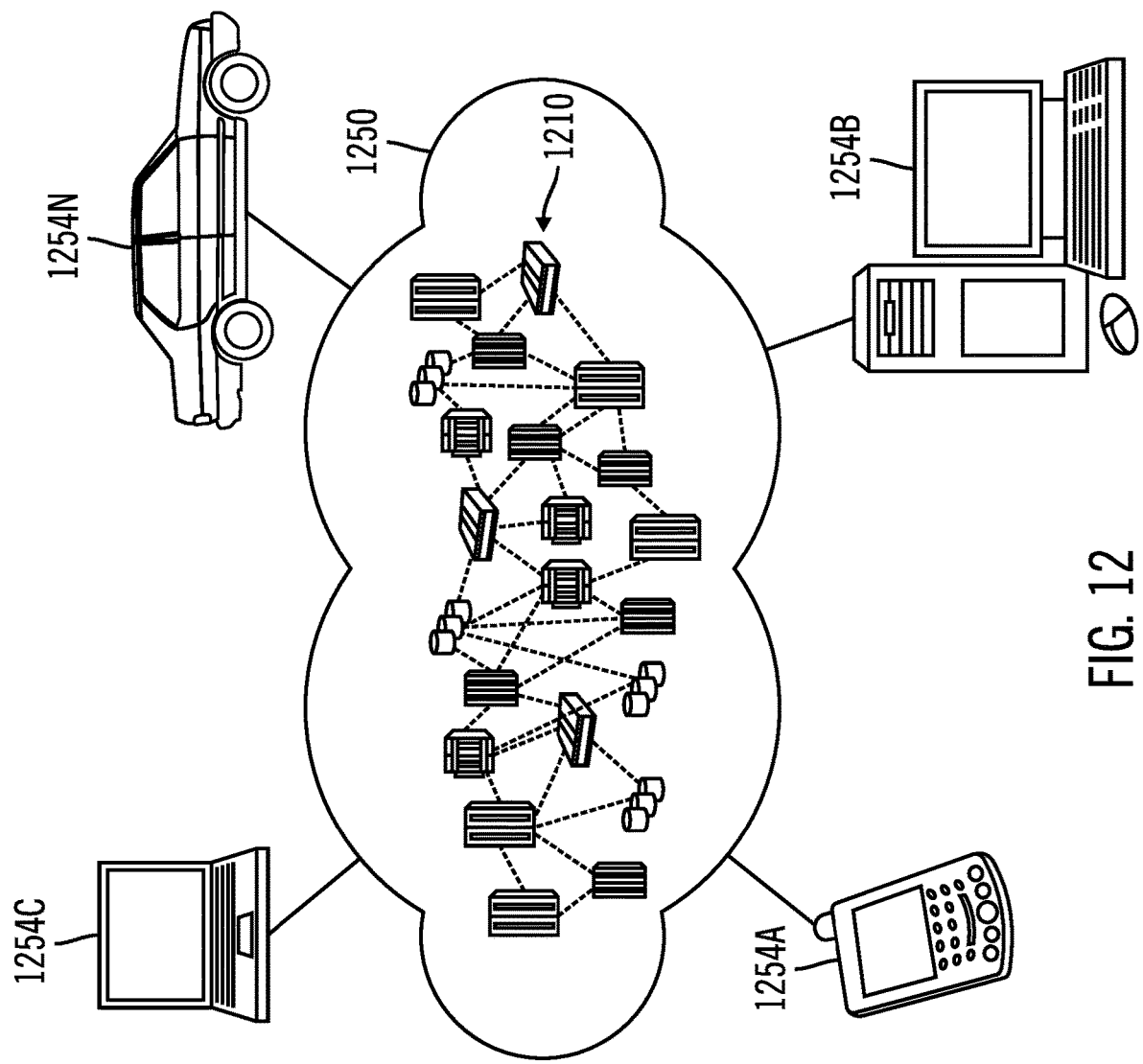
FIG. 12 illustrates a cloud computing environment in accordance with certain embodiments.

Referring now to FIG. 12, illustrative cloud computing environment 1250 is depicted. As shown, cloud computing environment 1250 includes one or more cloud computing nodes 1210 with which local computing devices used by cloud consumers, such as, for example, personal digital assistant (PDA) or cellular telephone 1254A, desktop computer 1254B, laptop computer 1254C, and/or automobile computer system 1254N may communicate. Nodes 1210 may communicate with one another. They may be grouped (not shown) physically or virtually, in one or more networks, such as Private, Community, Public, or Hybrid clouds as described hereinabove, or a combination thereof. This allows cloud computing environment 1250 to offer infrastructure, platforms and/or software as services for which a cloud consumer does not need to maintain resources on a local computing device. It is understood that the types of computing devices 1254A-N shown in FIG. 12 are intended to be illustrative only and that computing nodes 1210 and cloud computing environment 1250 can communicate with any type of computerized device over any type of network and/or network addressable connection (e.g., using a web browser).

Figure 13:
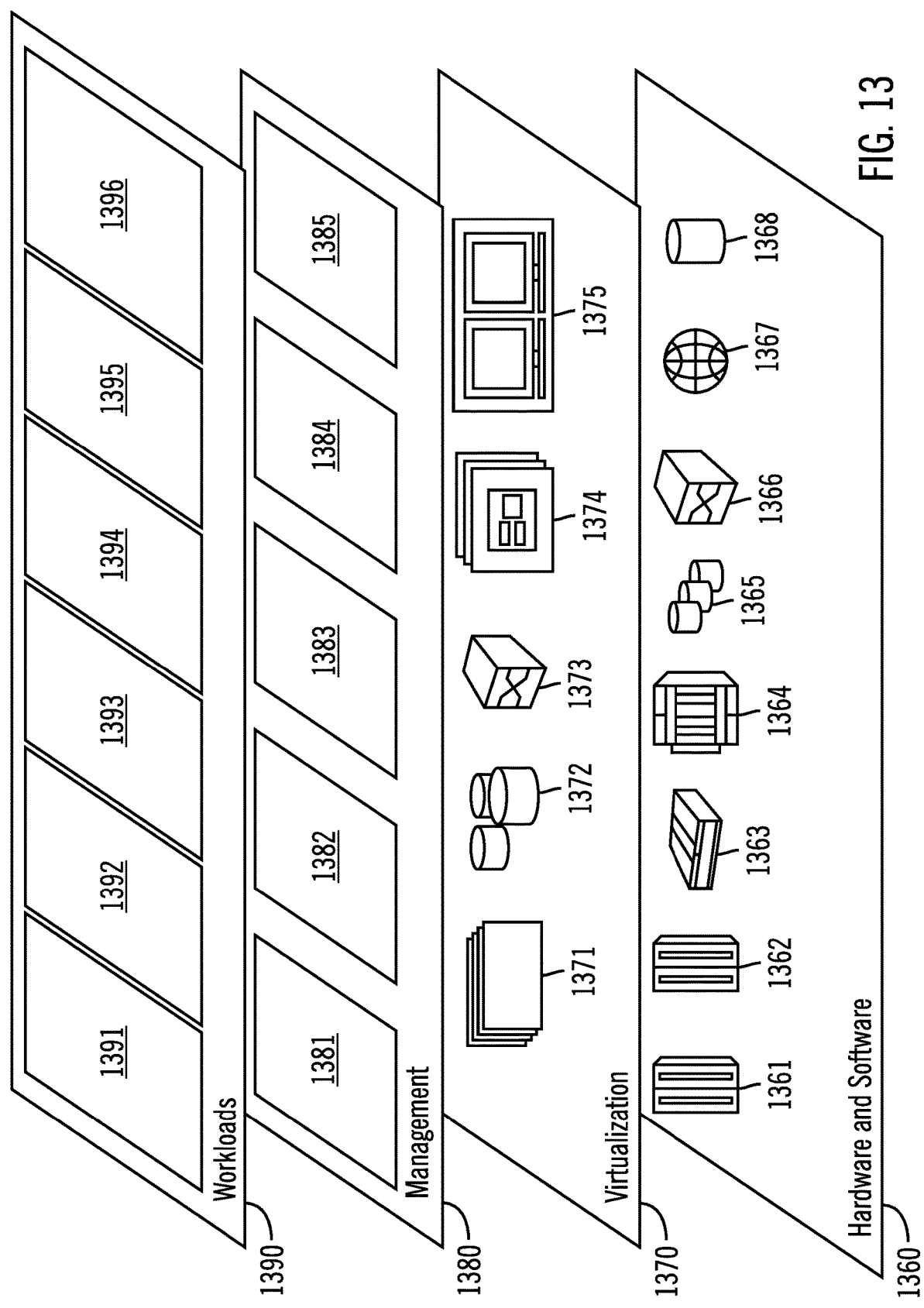
FIG. 13 illustrates abstraction model layers in accordance with certain embodiments.

Referring now to FIG. 13, a set of functional abstraction layers provided by cloud computing environment 1250 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 1360 includes hardware and software components. Examples of hardware components include: mainframes 1361; RISC (Reduced Instruction Set Computer) architecture based servers 1362; servers 1363; blade servers 1364; storage devices 1365; and networks and networking components 1366. In some embodiments, software components include network application server software 1367 and database software 1368.

Virtualization layer 1370 provides an abstraction layer from which the following examples of virtual entities may be provided: virtual servers 1371; virtual storage 1372; virtual networks 1373, including virtual private networks; virtual applications and operating systems 1374; and virtual clients 1375.

In one example, management layer 1380 may provide the functions described below. Resource provisioning 1381 provides dynamic procurement of computing resources and other resources that are utilized to perform tasks within the cloud computing environment. Metering and Pricing 1382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1383 provides access to the cloud computing environment for consumers and system administrators. Service level management 1384 provides cloud computing resource allocation and management such that required service levels are met. Service Level Agreement (SLA) planning and fulfillment 1385 provide pre-arrangement for, and procurement of, cloud computing resources for which a future requirement is anticipated in accordance with an SLA.

Workloads layer 1390 provides examples of functionality for which the cloud computing environment may be utilized. Examples of workloads and functions which may be provided from this layer include: mapping and navigation 1391; software development and lifecycle management 1392; virtual classroom education delivery 1393; data analytics processing 1394; transaction processing 1395; and domain specific correction of output from automatic speech recognition 1396

Thus, in certain embodiments, software or a program, implementing domain specific correction of output from automatic speech recognition in accordance with embodiments described herein, is provided as a service in a cloud environment.

Additional Embodiment Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended.

The foregoing description provides examples of embodiments of the invention, and variations and substitutions may be made in other embodiments.

What is claimed is:

1. A computer-implemented method, comprising operations for:
   receiving an output of an automatic speech recognition engine;
   extracting an alphanumeric sequence from the output;
   generating new candidates for the alphanumeric sequence by:
      breaking the alphanumeric sequence into phonetic segments;
      in response to determining that there are one or more phonetically matching candidates for a first prefix segment of the phonetic segments, adding the one or more phonetically matching candidates as first prefix candidates for the first prefix segment;
      in response to determining that there is no phonetically matching candidate for a second prefix segment of the phonetic segments, adding the second prefix segment as a second prefix candidate for the second prefix segment; and
      combining a different first prefix candidate with the second prefix candidate to generate the new candidates for the phonetic segment;
   generating scores for the new candidates using a correction model;
   adjusting each of the scores using any combination of statistical parameters and domain rules, wherein the statistical parameters comprise local correlations and global correlations, and wherein the domain rules comprise rules driven by business knowledge;
   ranking the new candidates based on the adjusted scores associated with the new candidates using machine learning;
   selecting a candidate of the ranked candidates having a highest score of the adjusted scores and based on a minimum edit distance of that candidate;
   correcting the output by replacing the alphanumeric sequence with the selected candidate; and
   returning the corrected output.

2. The computer-implemented method of claim 1, wherein the operations for ranking the new candidates further comprise:
   for each of the new candidates,
      aligning phonetic representations of the new candidate and the output for minimum edit distance; and
      storing the minimum edit distance for the new candidate.

3. The computer-implemented method of claim 1, wherein the correction model learns mappings of the alphanumeric sequence and different ways that the alphanumeric sequence sounds, incorporating noise and different accents of users that led to an erroneous translation in the output.

4. The computer-implemented method of claim 1, wherein a Software as a Service (SaaS) is configured to perform the operations of the computer-implemented method.

5. The computer-implemented method of claim 1, wherein the operations further comprise:
   extracting another alphanumeric sequence from another output, wherein the alphanumeric sequence comprises one or more special characters.

6. The computer-implemented method of claim 1, wherein the alphanumeric sequence comprises one or more alphabetic characters and one or more numbers.

7. A computer program product, the computer program product comprising a computer readable storage medium having program code embodied therewith, the program code executable by at least one processor to perform operations comprising:
   receiving an output of an automatic speech recognition engine;
   extracting an alphanumeric sequence from the output;
   generating new candidates for the alphanumeric sequence by:
      breaking the alphanumeric sequence into phonetic segments;
      in response to determining that there are one or more phonetically matching candidates for a first prefix segment of the phonetic segments, adding the one or more phonetically matching candidates as first prefix candidates for the first prefix segment;
      in response to determining that there is no phonetically matching candidate for a second prefix segment of the phonetic segments, adding the second prefix segment as a second prefix candidate for the second prefix segment; and
      combining a different first prefix candidate with the second prefix candidate to generate the new candidates for the phonetic segment;
   generating scores for the new candidates using a correction model;
   adjusting each of the scores using any combination of statistical parameters and domain rules, wherein the statistical parameters comprise local correlations and global correlations, and wherein the domain rules comprise rules driven by business knowledge;
   ranking the new candidates based on the adjusted scores associated with the new candidates using machine learning;
   selecting a candidate of the ranked candidates having a highest score of the adjusted scores and based on a minimum edit distance of that candidate;
   correcting the output by replacing the alphanumeric sequence with the selected candidate; and
   returning the corrected output.

8. The computer program product of claim 7, wherein the program code is executable by the at least one processor to perform further operations for ranking the new candidates comprising:
   for each of the new candidates,
      aligning phonetic representations of the new candidate and the output for minimum edit distance; and
      storing the minimum edit distance for the new candidate.

9. The computer program product of claim 7, wherein the correction model learns mappings of the alphanumeric sequence and different ways that the alphanumeric sequence sounds, incorporating noise and different accents of users that led to an erroneous translation in the output.

10. The computer program product of claim 7, wherein a Software as a Service (SaaS) is configured to perform the operations of the computer program product.

11. The computer program product of claim 7, wherein the program code is executable by the at least one processor to perform further operations comprising:
   extracting another alphanumeric sequence from another output, wherein the alphanumeric sequence comprises one or more special characters.

12. The computer program product of claim 7, wherein the alphanumeric sequence comprises one or more alphabetic characters and one or more numbers.

13. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more computer-readable memories, to perform operations comprising:
receiving an output of an automatic speech recognition engine;
extracting an alphanumeric sequence from the output;
generating new candidates for the alphanumeric sequence by:
breaking the alphanumeric sequence into phonetic segments;
in response to determining that there are one or more phonetically matching candidates for a first prefix segment of the phonetic segments, adding the one or more phonetically matching candidates as first prefix candidates for the first prefix segment;
in response to determining that there is no phonetically matching candidate for a second prefix segment of the phonetic segments, adding the second prefix segment as a second prefix candidate for the second prefix segment; and
combining a different first prefix candidate with the second prefix candidate to generate the new candidates for the phonetic segment;
generating scores for the new candidates using a correction model;
adjusting each of the scores using any combination of statistical parameters and domain rules, wherein the statistical parameters comprise local correlations and global correlations, and wherein the domain rules comprise rules driven by business knowledge;
ranking the new candidates based on the adjusted scores associated with the new candidates using machine learning;
selecting a candidate of the ranked candidates having a highest score of the adjusted scores and based on a minimum edit distance of that candidate;
correcting the output by replacing the alphanumeric sequence with the selected candidate; and
returning the corrected output.

14. The computer system of claim 13, wherein the operations for ranking the new candidates further comprise:
for each of the new candidates,
aligning phonetic representations of the new candidate and the output for minimum edit distance; and
storing the minimum edit distance for the new candidate.

15. The computer system of claim 13, wherein the correction model learns mappings of the alphanumeric sequence and different ways that the alphanumeric sequence sounds, incorporating noise and different accents of users that led to an erroneous translation in the output.

16. The computer system of claim 13, wherein a Software as a Service (SaaS) is configured to perform the operations of the computer system.

17. The computer system of claim 13, wherein the operations further comprise:
extracting another alphanumeric sequence from another output, wherein the alphanumeric sequence comprises one or more special characters.

18. The computer system of claim 13, wherein the alphanumeric sequence comprises one or more alphabetic characters and one or more numbers.

* * * * *